US012692374B2

(12) United States Patent
Krasovskiy et al.

(10) Patent No.: US 12,692,374 B2
(45) Date of Patent: Jul. 28, 2026

(54) COPOLYMERS OF ETHYLENE WITH (METH) ACRYLIC ESTER FUNCTIONALIZED POLYSILOXANE

(71) Applicants: Dow Global Technologies LLC, Midland, MI (US); Dow Silicones Corporation, Midland, MI (US)

(72) Inventors: Arkady L. Krasovskiy, Lake Jackson, TX (US); John O. Osby, Lake Jackson, TX (US); Andrew Heitsch, Angleton, TX (US); Eric Joffre, Midland, MI (US); Nanguo Liu, Midland, MI (US); Brian Dorvel, Pearland, TX (US); Alexandra Frankel, Lake Jackson, TX (US)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 560 days.

(21) Appl. No.: 18/245,511

(22) PCT Filed: Sep. 16, 2021

(86) PCT No.: PCT/US2021/050678

§ 371 (c)(1),
(2) Date: Mar. 15, 2023

(87) PCT Pub. No.: WO2022/060988

PCT Pub. Date: Mar. 24, 2022

(65) Prior Publication Data

US 2023/0365792 A1 Nov. 16, 2023

Related U.S. Application Data

(60) Provisional application No. 63/079,121, filed on Sep. 16, 2020.

(51) Int. Cl.

*C08L 23/06* (2006.01)
*C08G 77/20* (2006.01)
*C08G 77/442* (2006.01)

(52) U.S. Cl.

CPC .............. *C08L 23/06* (2013.01); *C08G 77/20* (2013.01); *C08G 77/442* (2013.01); *C08L 2203/16* (2013.01); *C08L 2205/02* (2013.01); *C08L 2207/066* (2013.01)

(58) Field of Classification Search

CPC .......... C08L 23/04; C08L 23/06; C08L 23/08; C08L 23/0807; C08L 23/081; C08L 23/0869; C08L 23/0892; C08L 33/062; C08L 33/10; C08L 43/04

See application file for complete search history.

(56) References Cited

U.S. PATENT DOCUMENTS

| | | | | |
|---|---|---|---|---|
| 3,645,992 | A | 2/1972 | Elston | |
| 3,914,342 | A | 10/1975 | Mitchell | |
| 4,076,698 | A | 2/1978 | Anderson et al. | |
| 4,599,392 | A | 7/1986 | McKinney et al. | |
| 5,272,236 | A | 12/1993 | Lai et al. | |
| 5,278,272 | A | 1/1994 | Lai et al. | |
| 5,582,923 | A | 12/1996 | Kale et al. | |
| 5,733,155 | A | 3/1998 | Sagawa | |
| 5,854,045 | A | 12/1998 | Fang et al. | |
| 6,239,244 | B1 | 5/2001 | Stepp et al. | |
| 8,691,923 | B2 | 4/2014 | Demirors et al. | |
| 2011/0253420 | A1* | 10/2011 | Sultan .................... | H01B 3/441 524/427 |

FOREIGN PATENT DOCUMENTS

| | | | |
|---|---|---|---|
| CN | 101448886 | A | 6/2009 |
| JP | H04108817 | A * | 4/1992 |
| WO | 1996/39349 | A1 | 12/1996 |
| WO | 2020/123507 | A1 | 6/2020 |

OTHER PUBLICATIONS

JPH04108817 machine translation (Year: 2025).*

Shinoda, H. et al Macromolecules vol. 34 pp. 3186-3194 (Year: 2001).*

Schunk, T.C. et al Journal of Chromatography A vol. 692 pp. 221-232 (Year: 1995).*

Baozheng Tian, et al., "Synthesis of polyethylene-g-polydimethylsiloxane graft copolymers by copolymerization of ethylene with polydimethylsiloxane macromonomer," European Polymer Journal 118, pp. 578-585 (2019).

Bruno H. Zimm, "Apparatus and Methods for Measurement and Interpretation of the Angular Variation of Light Scattering; Preliminary Results on Polystyrene Solutions," The Journal of Chemical Physics, vol. 16, No. 12, pp. 1099-1116 (1948).

International Search Report and Written Opinion for related International Application No. PCT/US2021/050678 dated Dec. 8, 2021 (13 total pages).

(Continued)

*Primary Examiner* — Jeffrey S Lenihan

(74) *Attorney, Agent, or Firm* — Dinsmore & Shohl LLP

(57) ABSTRACT

Various embodiments described herein are directed to a polymer composition comprising polyethylene and a reaction product of the copolymerization of the ethylene and (meth)acrylic ester functionalized polysiloxane, and optionally one or more units derived from a termonomer. Articles made from the polymer composition and methods of making the polymer composition are also described.

18 Claims, 4 Drawing Sheets

(56) References Cited

OTHER PUBLICATIONS

Kratochvil, P., "Fundamental Light-Scattering Methods," Classical Light Scattering from Polymer Solutions, Chapter 13, pp. 113-144 (1987).
Stephen T. Balke, et al., "A Strategy for Interpreting Multidetector Size-0Exclusion Chromatography Data II: Applications in Plastic Waste Recovery," Chromatography of Polymers, Chapter 13, pp. 199-219 (1992).
Thomas H. Mourey and Stephen T. Balke, "A Strategy for Interpreting Multidetector Size-Exlcusion Chromatography Data I: Development of a Systematic Approach," Chromatography of Polymers, Chapter 12, pp. 180-198 (1992).
Williams and Ward, "The Construction of a Polyethylene Calibration Curve for Gel Permeation Chromatography Using Polystyrene Fractions," J. Polym. Sci., Polymer Letters, vol. 6, pp. 621-624 (1968).
Chinese Office Action dated Apr. 28, 2025, pertaining to CN Patent Application No. 202180062717.7, 16 pgs.
Japanese Notice of Refusal dated Jul. 31, 2025, pertaining to JP Patent Application No. 2023-516567, 8 pgs.
Japanese Office Action dated Jan. 22, 2026, pertaining to JP Patent Application No. 2023-516567, 8 pgs.
Korean Office Action dated Mar. 6, 2026, pertaining to KR Patent Application No. 10-2023-7012259, 13 pgs.

* cited by examiner

COPOLYMERS OF ETHYLENE WITH (METH) ACRYLIC ESTER FUNCTIONALIZED POLYSILOXANE

CROSS REFERENCE TO RELATED APPLICATIONS

This application claims priority to U.S. Provisional Patent Application No. 63/079,121, filed on Sep. 16, 2020, and International Patent Application No. PCT/US2021/050678, filed on Sep. 16, 2021, the entireties of both which are hereby incorporated by reference.

TECHNICAL FIELD

Embodiments of the present disclosure are generally related to ethylene copolymers, and are more particularly related to copolymers of ethylene and (meth)acrylic ester functionalized polysiloxane.

BACKGROUND

Conventional low density polyethylene (LDPE) has good processability, although when used in, for example, film applications, slip additives are typically required to impart a low coefficient of friction (COF). However, such additives may migrate and leach out over time. Consequently, LDPE compositions may have such additives grafted thereon to prevent migration and leaching from the surface; one of the possible additives is polysiloxane; however, during the formation of siloxane-grafted LDPE polymers it is difficult to achieve high levels of attachment of the siloxane to the LDPE that results in low processability, poor optics and exhibit inconsistent COF behavior due to lack of homogeneity between the remaining unattached polysiloxane and polyethylene. To avoid those drawback such compositions require special purification to remove unreacted polysiloxane after grafting event making the process inefficient and expensive.

Accordingly, a need exists for LDPE compositions with greater levels of attached siloxanes and improved homogeneity.

SUMMARY

The present disclosure meets these needs by providing an ethylene-based polymer composition formed by high pressure (greater than or equal to 100 MPa), free-radical polymerization by reacting: ethylene monomer and (meth)acrylic ester functionalized polydimethylsiloxane affording low density polyethylene based (PDMS-co-LDPE) polymer compositions, which exhibit lesser amount of unattached (free) PDMS compare to grafting approach for the same weight percent (wt %) of introduced siloxane and similar molecular weight of introduced siloxane which, in turn, results in improved processability and optics compared to grafted analogs. It should be noted that grafted analogs can be additionally purified from unreacted siloxane, but this will require an additional step and set up, while the polymers of various embodiments described herein may not require any such follow up purification.

According to at least one embodiment of the present disclosure, a polymer composition comprises polyethylene and a reaction product of the copolymerization of the ethylene and (meth)acrylic ester functionalized polysiloxane, and optionally one or more units derived from a termonomer.

According to another embodiment, a polymer composition comprises the polymer composition of the previous embodiment, wherein the polymer composition is a copolymer comprising low density polyethylene and a reaction product of the copolymerization of the ethylene and (meth) acrylic ester functionalized polysiloxane.

According to another embodiment, a polymer composition comprises the polymer composition of any one of the previous embodiments, comprising one or more of the following structures:

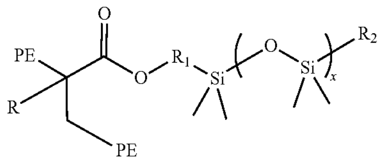

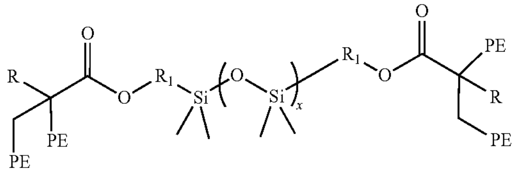

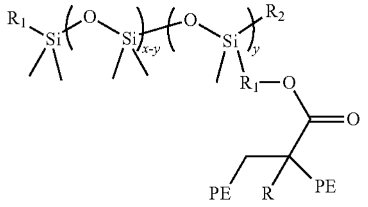

where R is methyl or hydrogen, $R^1$ is a bridge group that connects functional group ((meth)acrylate) with siloxane, $R^2$ is an end group selected from the group consisting of alkyl, substituted alkyl, aryl, alkenyl, H, and OH, x is an integer from 10 to 1000, and y is an integer from 1 to 20.

According to another embodiment, a polymer composition comprises the polymer composition of any one of the previous embodiments, wherein the (meth)acrylic ester functionalized polysiloxane has a structural formula of one or more of the following:

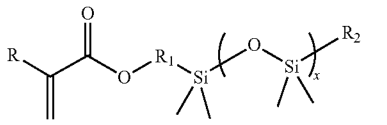

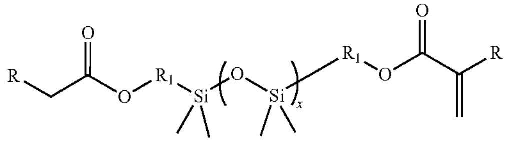

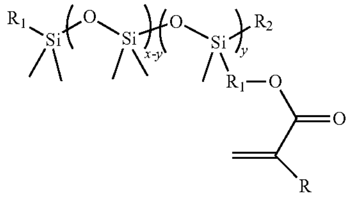

where R is methyl or hydrogen, $R^1$ is a bridge group, $R^2$ is an end group selected from alkyl, aryl, alkenyl, H, or OH, x is an integer from 10 to 1000, and y is an integer from 1 to 20.

According to another embodiment, a polymer composition comprises the polymer composition of any one of the previous embodiments, wherein each bridge group is selected from the group consisting of substituted and unsubstituted $C_2$-$C_{20}$ alkylene linker, where one or more carbon atoms may be substituted with oxygen, silicon, a substituted or unsubstituted aryl group, or derivatives and combinations thereof.

According to another embodiment, a polymer composition comprises the polymer composition of any one of the previous embodiments, wherein the polymer composition has an MWD of 3 to 50.

According to another embodiment, a polymer composition comprises the polymer composition of any one of the previous embodiments, wherein the termonomer is present and is selected from the group consisting of an olefin, an unsaturated ester, an unsaturated acid, mono- or diester of maleic acid, a functionalized alkene, and combinations thereof.

According to another embodiment, a polymer blend comprises the polymer composition of any one of the previous embodiments, and one or more additional polymer.

According to another embodiment, a polymer blend comprises the polymer blend of the previous embodiment, wherein the additional polymer comprises low density polyethylene (LDPE), linear low density polyethylene (LLDPE), ultra low density polyethylene (ULDPE), very low density polyethylene (VLDPE), medium density polyethylene (MDPE), high density polyethylene (HDPE), a copolymer including a (meth)acrylate ester, a copolymer comprising (meth)acrylic acid, mono- or diester of maleic acid, a copolymer comprising vinyl acetate, a copolymer comprising trialkoxy vinylsilane, or grafted polyethylenes.

According to another embodiment, an article comprises the polymer composition of any one of the previous embodiments, comprising the polymer composition of the previous embodiments.

According to another embodiment, an article comprises the article of the previous embodiment, wherein the article is a film.

According to another embodiment, a process comprises reacting, in a polymerization reactor under free-radical polymerization conditions and at a pressure greater than or equal to 100 MPa, ethylene monomer and a (meth)acrylate ester functionalized polysiloxane to produce polyethylene and a copolymer comprising low density polyethylene and functionalized polydimethylsiloxane.

According to another embodiment, process comprises the process of the previous embodiment, wherein the copolymer comprises one or more of the following structures:

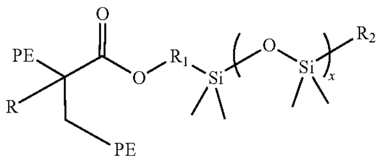

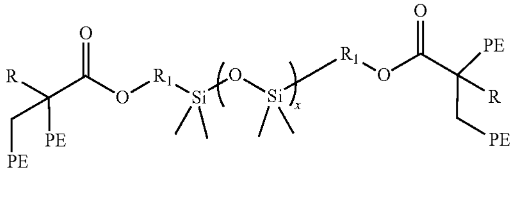

-continued

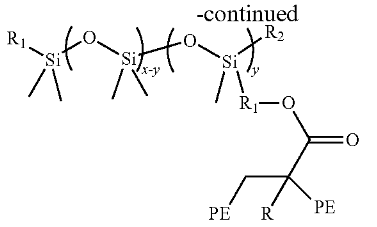

where R is methyl or hydrogen, $R^1$ is a bridge group that connects functional group ((meth)acrylate) with siloxane, $R^2$ is an end group selected from the group consisting of alkyl, substituted alkyl, aryl, alkenyl, H, and OH, x is an integer from 10 to 1000, and y is an integer from 1 to 20.

According to another embodiment, a process comprises the process of any one of the previous embodiments, wherein the (meth)acrylic ester functionalized polysiloxane has a structural formula of one or more of the following:

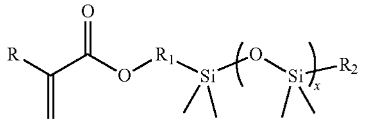

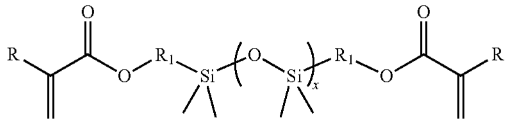

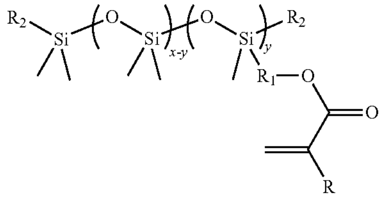

where R is methyl or hydrogen, $R^1$ is a bridge group, $R^2$ is an end group selected from alkyl, aryl, alkenyl, H, or OH, x is an integer from 10 to 1000, and y is an integer from 1 to 20.

According to another embodiment, a process comprises the process of any one of the previous embodiments, wherein each bridge group is selected from the group consisting of substituted and unsubstituted $C_2$-$C_{20}$ alkylene linker, where one or more carbon atoms may be substituted with oxygen, silicon, a substituted or unsubstituted aryl group, or derivatives and combinations thereof.

These and other embodiments are described in more detail in the following Detailed Description and the Drawings.

DETAILED DESCRIPTION

Figure 1A:
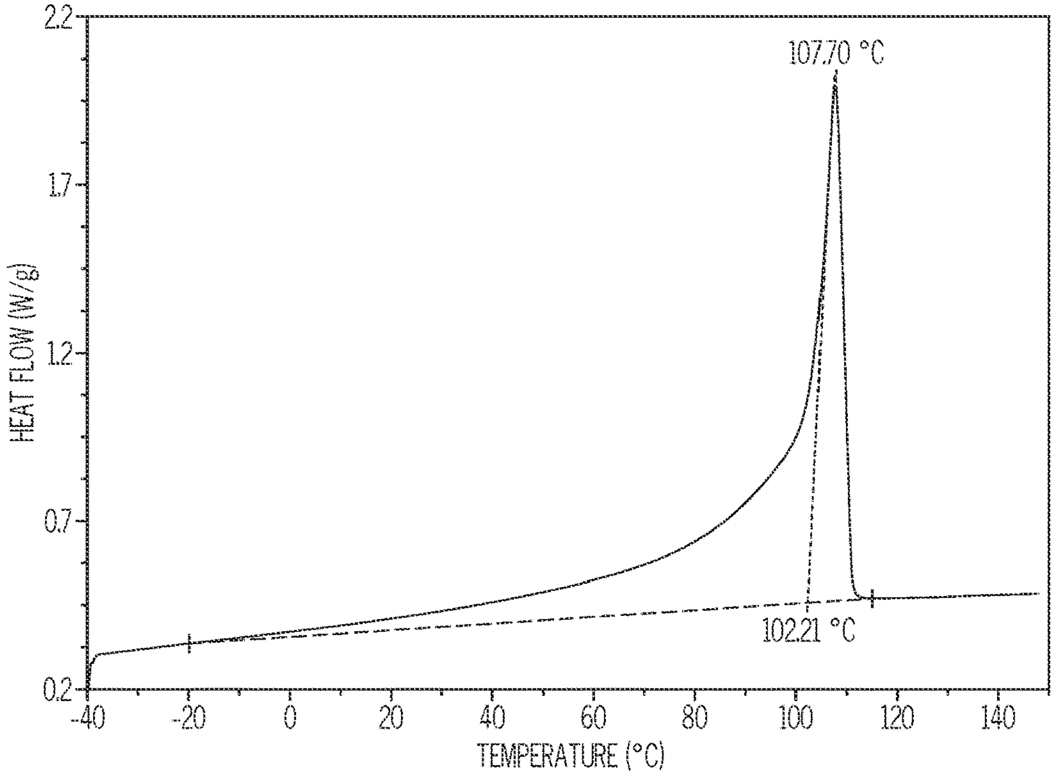
FIG. 1A is a differential scanning calorimetry (DSC) second heating curve of an example LDPE-co-PDMS according to one or more embodiments shown and described herein.

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

Definitions

Any reference to the Periodic Table of Elements is that as published by CRC Press, Inc., 1990-1991. Reference to a group of elements in this table is by the new notation for numbering groups.

The numerical ranges disclosed herein include all values from, and including, the upper and lower values. For ranges containing explicit values (e.g., from 1 or 2 or 3 to 5 or 6 or 7), any subrange between any two explicit values is included (e.g., the range 1-7 above includes subranges of from 1 to 2; from 2 to 6, from 5 to 7; from 3 to 7; from 5 to 6; etc.).

Unless stated to the contrary, implicit from the context, or customary in the art, all parts and percentages are based on weight and all test methods are current as of the filing date of this disclosure.

The term "composition" refers to a mixture of materials which comprise the composition, as well as reaction products and decomposition products formed from the materials of the composition.

The terms "comprising," "including," "having," and their derivatives, are not intended to exclude the presence of any additional component, step, or procedure, whether or not the same is specifically disclosed. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes the use of the plural and vice versa.

As used herein, a "pendant functional group" refers to a functional group on a polymer backbone at a location other than a terminal end.

The term "polymer" refers to a polymeric compound prepared by polymerizing monomers, whether of the same or a different type, that in polymerized form provide the multiple and/or repeating "units" that make up a polymer. The generic term polymer thus embraces the term "homopolymer," usually employed to refer to polymers prepared from only one type of monomer as well as "copolymer" which refers to polymers prepared from two or more different monomers. It is noted that although a polymer is often referred to as being "made of" one or more specified monomers, "based on" a specific monomer or monomer type, "containing" a specified monomer content, or the like, in this context, the term "monomer" is understood to be referring to the polymerized remnant of the specified monomer.

The terms "blend" or "polymer blend," as used herein, refer to a mixture of two or more polymers. A blend may or may not be miscible (not phase separated at the molecular level). A blend may or may not be phase separated. A blend may be effected by physically mixing the two or more polymers on the macro level (for example, melt blending resins or compounding), or the micro level (for example, simultaneous forming within the same reactor).

The term "terminal alkene group," as used herein, refers to a double bond between two carbon atoms in a polymer chain, wherein one of the carbons in the double-bond is a $=CH2$ group. Terminal double bonds are located at terminal ends of polymer chains and/or at branched ends of polymer chains. The term "internal alkene group," as used herein, refers to a 1,2-disubstituted carbon-carbon double bond, the carbon atoms are in a trans-configuration (not a cis-configuration). Terminal alkene groups and internal alkene groups are measured by infrared spectroscopy ("IR").

"Polyethylene" or "ethylene-based polymer" shall mean polymers comprising greater than 50% by mole of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); Medium Density Polyethylene (MDPE); and High Density Polyethylene (HDPE).

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm.

The term "LLDPE" includes resin made using Ziegler-Natta catalyst systems as well as resin made using single-site catalysts, including, but not limited to, bis-metallocene catalysts (sometimes referred to as "m-LLDPE") and constrained geometry catalysts, and resin made using post-metallocene, molecular catalysts. LLDPE includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or U.S. Pat. No. 5,854,045). The LLDPE resins can be made via gas-phase, solution-phase or slurry polymerization or any combination thereof, using any type of reactor or reactor configuration known in the art.

The term "MDPE" refers to polyethylenes having densities from 0.926 to 0.945 g/cc. "MDPE" is typically made using chromium or Ziegler-Natta catalysts or using single-site catalysts including, but not limited to, bis-metallocene catalysts and constrained geometry catalysts.

The term "HDPE" refers to polyethylenes having densities greater than about 0.945 g/cc, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.909 g/cc, which are generally prepared with Ziegler-Natta catalysts, single-site catalysts including, but not limited to, bis-metallocene catalysts and constrained geometry catalysts, and post-metallocene, molecular catalysts. The term "propylene-based polymer," as used herein, refers to a polymer that comprises, in polymerized form, refers to polymers comprising greater than 50% by weight of units which have been derived from propylene monomer. This includes propylene homopolymer, random copolymer polypropylene, impact copolymer polypropylene, propylene/α-olefin interpolymer, and propylene/α-olefin copolymer. These polypropylene materials are generally known in the art.

As used herein, the term "siloxane" includes polysiloxanes and lower molecular weight siloxanes. In embodiments, the siloxane is polydimethylsiloxane (PDMS) with various end groups described below.

As used herein, a "SiH functional methacrylate converter" refers to 3-(1,1,3,3-tetramethyldisiloxanyl)propyl methacrylate:

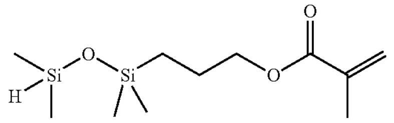 [SMILES: C=C(C)C(=O)OCCC[Si](C)(C)O[SiH](C)C]

Copolymers of Ethylene and Functionalized Polysiloxane

Various embodiments described herein provide copolymers of ethylene and functionalized polysiloxane. In embodiments, the copolymers are formed by high pressure, free-radical polymerization by reacting ethylene monomer and functionalized polysiloxane, sometimes referred to herein as f-PDMS, or by reacting ethylene monomer and a mixture of functionalized polysiloxanes. In embodiments, PDMS is attached to the high pressure ethylene polymer via several covalent bonds that are resulting from the reaction of the initial function of the functionalized PDMS with growing propagating chain of the ethylene polymer followed up by further reaction with ethylene monomers and also includes bridge between functional group that gets polymerized and siloxane.

In embodiments, the LDPE-co-PDMS may include from 0.1 wt % to 50 wt % of PDMS, such as from 0.1 wt % to 20 wt %, from 0.5 wt % to 20 wt %, from 2.0 wt % to 20 wt %, from 2.0 wt % to 15 wt %, from 2.0 wt % to 12 wt %, from 2.0 wt % to 10 wt %, from 1.0 wt % to 10 wt %, from 5.0 wt % to 10 wt %, or from 5.0 wt % to 20 wt %, based on a total weight of the LDPE-co-PDMS composition which also includes LDPE formed during copolymerization but not covalently attached to PDMS.

In various embodiments, the copolymer comprises one or more of the following structures, but not limited to:

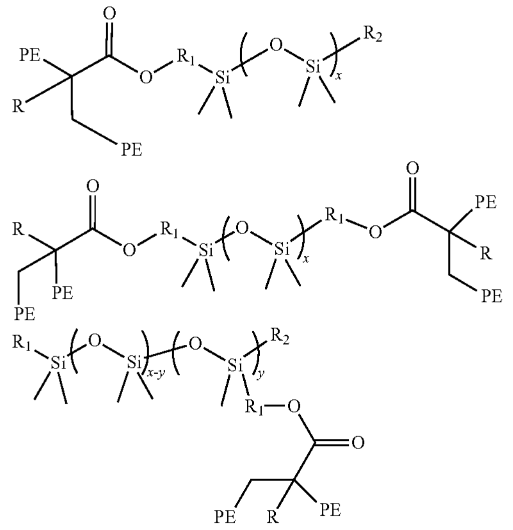

where R is methyl or hydrogen, $R^1$ is a bridge group that connects functional group ((meth)acrylate) with siloxane, $R^2$ is an end group selected from the group consisting of alkyl, substituted alkyl, aryl, alkenyl, H, and OH, x is an integer from 10 to 1000, and y is an integer from 1 to 20. $R^1$ and $R^2$ groups can be the same or different.

In embodiments, the bridge group of the LDPE-co-PDMS is selected from substituted or unsubstituted $C_2$-$C_{20}$ alkylene linker where one or more carbon atoms can be substituted with oxygen and/or silicon, a substituted or unsubstituted aryl group, and derivatives and combinations thereof. In embodiments, the functional group bound to the bridge group is bound to the high pressure ethylene polymer by means of copolymerization with ethylene monomer. In various embodiments, the functional group is a (meth) acrylate ester group. In further embodiments, the bridge group is the group depicted below:

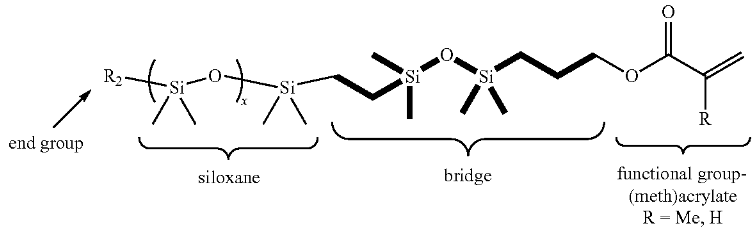

In the structural formulas above, the ethylene-based polymeric branch is depicted as being a polyethylene (PE), but it is contemplated that, in embodiments, the ethylene-based polymeric branch can be a homopolymer (e.g., LDPE) or a copolymer, such as an ethylene (meth)acrylic ester copolymer, or ethylene (meth)acrylic acid copolymer, or ethylene vinyltrimethoxysilane copolymer, or ethylene vinyl acetate copolymer.

The polymer comprises a polysiloxane unit, which in embodiments, is derived from functionalized polydimethylsiloxane (e.g., f-PDMS). In embodiments, the functionalized polysiloxane is a (meth)acrylate ester functionalized polymethyldisiloxane (f-PDMS), where (meth)acrylate function attached to the PDMS via a bridge.

In embodiments, the polymer optionally comprises one or more units derived from a termonomer. The termonomer may be selected from the group consisting of an olefin, an unsaturated ester, an unsaturated acid, a functionalized alkene, and combinations thereof.

Functionalized Polysiloxane

The polysiloxane can be any of a diverse class of polymers manufactured as fluids, resins, or elastomers. Polysiloxanes are partially organic compounds, but, unlike most polymers, they have a backbone containing no carbon, composed instead of alternating silicon and oxygen atoms, as shown above. Although in the structural formulas shown above, each silicon is illustrated as being bound to a methyl and/or R groups, it is contemplated that each of those positions can individually be an alkyl, vinyl, phenyl, hydrogen, hydroxyl, acetoxy, enoxy, oxime, methoxy, ethoxy, alkoxy, dimethylamino, aminopropyl, hydroxypropyl, mercaptopropyl, chloropropyl, acryloxyprogpyl, methacryloxypropyl, epoxypropoxypropyl, or epoxycyclohexylethyl. In embodiments, each position is methyl.

In some embodiments, x is sufficiently large such that the polysiloxane has a viscosity of 100 or more, 200 or more, or 500 or more, centistokes (CST). In embodiments, x is no larger than would produce a polysiloxane with a viscosity no greater than 2.5 million CST. However it is contemplated that the upper limit on the viscosity is lower than 2.5 million CST, for example, 1 million or 600,000 CST.

Polysiloxanes suitable for use in various embodiments include those described in U.S. Pat. No. 6,239,244, the entire contents of which is hereby incorporated by reference in its entirety. The polysiloxanes, and are commercially available from a number of different manufacturers including, but not limited to Dow, Momentive, Wacker, Shin-Etsu, and Evonik.

In various embodiments described herein, the polysiloxane is a polydimethylsiloxane (PDMS) that includes one or more functional groups and is, therefore, referred to a functionalized PDMS, or f-PDMS. In various embodiments, the f-PDMS is a (meth)acrylate ester functionalized PDMS, where the (meth)acrylate ester group is bonded to the PDMS through a bridge group. The PDMS may be monofunctional or difunctional or polyfunctional, and the functional group(s) may be linked at a terminal or pendant location on the siloxane. Accordingly, in embodiments, the f-PDMS comprises one of the following structures or combinations thereof:

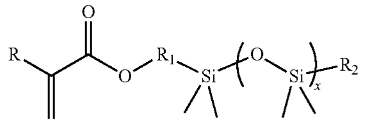

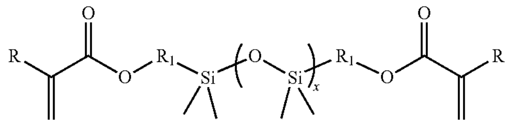

-continued

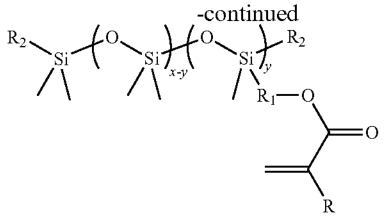

where R is methyl or hydrogen, $R^1$ is a bridge group, $R^2$ is an end group selected from alkyl, aryl, alkenyl, H, or OH, x is an integer from 10 to 1000, and y is an integer from 1 to 20.

Process—Functionalized Polysiloxane

In various embodiments, each of the bridge groups in f-PDMS is determined by the method in which the siloxane backbone is linked to the (meth)acrylate functionality. In embodiments, the siloxane backbone is linked to the (meth) acrylate functionality through direct hydrosilylation of an alkenyl (meth)acrylate, hydrosilylation of mono- or polyvinyl PDMS using an SiH functional (meth)acrylate converter, or equilibration/condensation with a (meth)acrylate functional alkoxy silane. Other methods for linking the siloxane backbone and the (meth)acrylate functionality are contemplated and may be used, depending on the particular embodiment.

Process—Copolymers of Ethylene and Functionalized Polysiloxane

In various embodiments, the LDPE-co-PDMS is formed in the presence of ethylene. In embodiments, the LDPE-co-PDMS is produced via a high pressure, free-radical polymerization process. Two different high pressure free-radical initiated polymerization process types are known. In the first process type, an agitated autoclave reactor having one or more reaction zones is used. The autoclave reactor includes several injection points for initiator or monomer feeds, or both. In the second process type, a jacketed tube is used as a reactor, which has one or more reaction zones. Suitable reactor lengths include, but are not limited to, from 100 to 3000 meters (m), or from 1000 to 2000 m. The beginning of a reaction zone, for either type of reactor, is typically defined by the side injection of initiator of the reaction, ethylene, chain transfer agent (or telomer), comonomer(s), or combinations thereof. A high pressure process can be carried out in autoclave reactors or tubular reactors having one or more reaction zones, or in a combination of autoclave reactors and tubular reactors, each comprising one or more reaction zones.

In various embodiments, chain transfer agents (CTAs) may be used to control polymer properties, including but not limited to, molecular weight of the resultant polymer and the melt index. Chain transfer involves the termination of growing polymer chains, thus limiting the ultimate molecular weight of the polymer material. Chain transfer agents are typically hydrogen atom donors that will react with a growing polymer chain and stop the polymerization reaction of the chain. For high pressure free radical polymerization, CTAs can be of many different types, such as saturated hydrocarbons, unsaturated hydrocarbons, aldehydes, ketones, or alcohols. Non-limiting examples of CTAs include propylene, isobutane, n-butane, 1-butene, methyl ethyl ketone, acetone, ethyl acetate, propionaldehyde, products available under the tradename ISOPAR (available from ExxonMobil Chemical Co.), and isopropanol. In embodiments, the amount of CTA used in the process is from 0.01 wt % to 10 wt % of the total reaction mixture.

In embodiments, the free radical initiator can include a CTA as a solvent or as a blend for simultaneous injection with ethylene. For example, a CTA may be blended with ethylene, pressurized, and then injected into the reactor.

In various embodiments, one or more free radical initiators are used to produce the LDPE-co-PDMS. Free radical initiators that are generally used to produce ethylene-based polymers, such as LDPE, are oxygen and peroxides. Non-limiting examples of free radical initiators include t-butyl peroxy pivalate, di-t-butyl peroxide, t-butyl peroxy acetate (TPA), t-butyl peroxyoctoate (TPO), t-butyl peroxy-2-hexanoate, and combinations thereof. Other initiators known and used in the art are contemplated. In embodiments, the initiator is included in conventional amounts, such as from 0.005 wt % to 0.2 wt % based on the weight of polymerizable monomers. In embodiments, the initiator is injected prior to the reaction zone or within the reaction zone where free radical polymerization is to be induced. Termination of catalyst activity may be achieved by a combination of high reactor temperatures for the free radical polymerization portion of the reaction, or by feeding initiator into the reactor dissolved in a mixture of a polar solvent such as propanol, water, or conventional initiator solvents, such as branched or unbranched alkanes. In embodiments, the free radical initiator initiate polyethylene chain formation, followed by an attack of this propagating chain onto functional group of the f-PDMS (e.g., the (meth)acrylate ester group), followed by further reaction of the freshly formed α-carbonyl radical with ethylene monomers thus enabling the ethylene (in either monomeric or polymeric form) to attach to the (meth) acrylate ester.

In embodiments, at least one hydrocarbon solvent may be included in the free radical initiator system. The hydrocarbon solvent may, for example, be a $C_5$ to $C_{30}$ hydrocarbon solvent. Exemplary hydrocarbon solvents include, by way of example and not limitation, mineral solvents, normal paraffinic solvents, isoparaffinic solvents, cyclic solvents, and the like. In embodiments, the hydrocarbon solvents are selected from the group consisting of n-octane, iso-octane (2,2,4-trimethylpentane), n-dodecane, iso-dodecane (2,2,4,6,6,-pentamethylheptane), and other isoparaffinic solvents. Example hydrocarbon solvents such as isoparaffinic solvents, for example, are commercially available under the trademarks ISPAR C, ISOPAR E, and ISOPAR H from ExxonMobil Chemical Co. In embodiments, the hydrocarbon solvent comprises less than 99 wt % of the free radical initiator system.

Embodiments may further include a polar co-solvent, such as an alcohol co-solvent (e.g., a $C_1$ to $C_{30}$ alcohol), an aldehyde, a ketone, or an ester. The alcohol functionality of the alcohol co-solvent may be mono-functional or multi-functional. Suitable alcohol co-solvents can include, by way of example and not limitation, isopropanol (2-propanol), allyl alcohol, 1-pentanol, methanol, ethanol, propanol, 1-butanol, 1,4-butanediol, combinations thereof, or mixtures thereof. In embodiments, the polar co-solvent may be included in an amount of less than 40 wt % of the free radical initiator system.

Other additives, such as processing aids, plasticizers, stabilizers, ultraviolet light absorbers, antistatic agents, pigments, dyes, nucleating agents, fillers, slip agents, fire retardants, lubricants, smoke inhibitors, viscosity control agents, and anti-blocking agents. In embodiments, one or more of the additives are included in an amount of less than 50 wt % of the combined weight of the additives, based on the weight of the polymer.

In embodiments, the process includes a process recycle loop to further improve conversion efficiency. In such embodiments, the downstream reaction area or zone is maintained at a temperature that is lower than that at which the ethylene-based polymer would phase separate from the polysiloxane. In embodiments, the recycle loop may be treated to neutralize residues or byproducts from the previous reaction cycle, since such residues or byproducts may inhibit polymerization of either the polysiloxane or the ethylene-based polymer.

Ethylene, f-PDMS, initiator, and CTA are each added to the reactor at one or more locations to achieved desired ratios of components in the feeds to and or in the reaction zones of the reactor. As will be appreciated by those skilled in the art, the choice of feed point for each component into the reactor and/or a reaction zone depends on several factors, including, but not limited, to the solubility and/or condensation of components in pressurized ethylene and/or fouling that may occur in the pre-heater used to heat the reactor contents prior to injection of the initiator.

Ethylene used for the production of the LDPE-co-PDMS may be purified ethylene obtained by removing polar components from a loop recycle stream or a reaction system configuration in which only fresh ethylene is used for making the LDPE-co-PDMS polymer.

In embodiments, the polymerization is carried out in a continuously stirred tank reactor using propylene as a chain transfer agent. Ethylene and propylene are fed to the top of the reactor along the agitator shaft. In embodiments, tert-butyl peroxyacetate (TPA) and tert-butyl peroxyoctoate (TPO) are used as initiators injected into the side of the reactor. In embodiments, the f-PDMS is separately injected into the side of the reactor.

In embodiments, the maximum temperature in each reaction zone is from 150° C. to 360° C., from 170° C. to 350° C., or from 200° C. to 325° C. In embodiments, the polymerization pressure at the inlet of the reactor is from 100 MPa to 360 MPa, from 150 MPa to 340 MPa, or from 185 MPa to 320 MPa. Following polymerization, the contents of the reactor, including unreacted reactants and the LDPE-co-PDMS polymer, are emitted from an outlet of the reactor.

The LDPE-co-PDMS polymer may be separated from any remaining reactants according to any method known and used in the art. In embodiments, atomization is used to separate the LDPE-co-PDMS polymer from the remaining reactants, and the LDPE-co-PDMS polymer is collected in powder form.

Although certain particular LDPE-co-PDMS structures are illustrated in the figures and structures presented herein, it is contemplated that other structures are possible and contemplated. Additionally, in embodiments, the LDPE-co-PDMS polymer is present in a blend comprising one or more of the structures depicted herein. For example, in embodiments, in addition to attachment of the f-PDMS to LDPE by copolymerizing the double bond of the functional group with ethylene, the reaction may also yield some amount of byproduct where LDPE is attached to PDMS through methyl group of the PDMS via chain transfer mechanism. Moreover, it should be appreciated that the LDPE-co-PDMS may constitute only a small amount of the reaction product, with a major portion of the reaction product being LDPE. In embodiments, the LDPE-co-PDMS is present in a blend comprising at least one additional polymer. The additional polymer can be, for example, low density polyethylene (LDPE), linear low density polyethylene (LLDPE), ultra low density polyethylene (ULDPE), very low density polyethylene (VLDPE), medium density polyethylene (MDPE), high density polyethylene (HDPE), a copolymer including a (meth)acrylate ester, a copolymer comprising (meth)acrylic acid, mono- or diester of maleic acid, a copolymer comprising vinyl acetate, a copolymer comprising trialkoxy vinylsilane, grafted polyethylenes, or derivatives or combinations thereof.

In embodiments, the LDPE-co-PDMS may have a polydispersity index (PDI) of from 3.0 to 50.0, such as from 3.0 to 45.0, from 3.0 to 40.0, from 3.0 to 35.0, from 3.0 to 30.0, from 3.0 to 20.0, from 3.0 to 15.0, from 3.0 to 10.0, from 4.0 to 50.0, such as from 4.0 to 45.0, from 4.0 to 40.0, from 4.0 to 35.0, from 4.0 to 30.0, from 4.0 to 20.0, from 4.0 to 15.0, from 4.0 to 10.0, from 5.0 to 50.0, such as from 5.0 to 45.0, from 5.0 to 40.0, from 5.0 to 35.0, from 5.0 to 30.0, from 5.0 to 20.0, from 5.0 to 15.0, from 5.0 to 10.0, from 7.0 to 50.0, such as from 7.0 to 45.0, from 7.0 to 40.0, from 7.0 to 35.0, from 7.0 to 30.0, from 7.0 to 20.0, from 7.0 to 15.0, from 7.0 to 10.0, from 8.0 to 50.0, such as from 8.0 to 45.0, from 8.0 to 40.0, from 8.0 to 35.0, from 8.0 to 30.0, from 8.0 to 20.0, from 8.0 to 14.0, or from 8.0 to 10.0. In embodiments, the LDPE-co-PDMS may have a PDI of from 3.0 to 14.0, from 5.0 to 14.0, or from 7.0 to 14.0. In embodiments, the LDPE-co-PDMS may have a melt index ($I_2$) of from 0.15 to 500.00 g/10 min, such as from 0.15 to 100 g/10 min, from 0.15 to 25.00 g/10 min, from 0.15 to 10.00 g/10 min, from 0.3 to 1.7, from 0.3 to 2.0, from 0.3 to 3.0, from 0.3 to 10, from 0.5 to 1.7, from 0.5 to 2.0, from 0.5 to 3.0, from 0.5 to 10, from 1.0 to 1.7, from 1.0 to 2.0, from 1.0 to 3.0, from 1.0 to 10, from 1.3 to 1.7, from 1.3 to 2.0, from 1.3 to 3.0, from 1.3 to 10, from 0.50 to 10.00 g/10 min, or from 0.50 to 7.50 g/10 min. PDI is determined by "conventional GPC" or "3D-GPC".

Uses

Embodiments of the LDPE-co-PDMS polymer described herein may be employed in a variety of thermoplastic fabrication processes to produce useful articles, including objects comprising one or more film layers, molded articles, extrusions, fibers, and woven or non-woven fabrics, pipes, cables, liners. Thermoplastic compositions including the LDPE-co-PDMS polymer include blends with other natural or synthetic materials, polymers, additives, reinforcing agents, ignition resistant additives, antioxidants, stabilizers, colorants, extenders, crosslinkers, blowing agents, and plasticizers.

Various suitable applications for the LDPE-co-PDMS polymer include fabricated articles using conventional polyolefin processing techniques, elastic films and fibers, soft touch goods, gaskets and profiles, adhesives, footware, auto interior parts and profiles, foam goods, impact modifiers, coated fabrics, hoses, tubing, weather stripping, cap liners, flooring, and the like.

In embodiments, films comprising LDPE-co-PDMS may exhibit a peel max force of less than or equal to 5 Newtons (N), such as from 0.3 N to 5 N, from 1 N to 4.5 N, from 1 N to 4 N, from 1.5 N to 4 N, from 2.0 N to 4.5 N, from 2.5 N to 4.5 N, or from 3 N to 4.5 N. In embodiments, films comprising LDPE-co-PDMS may exhibit a static coefficient of friction (COF) of from 0.05 to 0.50, or from 0.2 N to 0.4 N, and a dynamic coefficient of friction (COF) of from 0.05 to 0.50, or from 0.2 N to 0.4 N.

TESTING METHODS

The test methods include the following:

Melt Index ($I_2$)

Melt index ($I_2$) is measured in accordance with ASTM D-1238 at 190° C. at 2.16 kg. The values are reported in g/10 min (or dg/min), which corresponds to grams eluted per 10 minutes. Multiple measurements were taken for each sample.

Density

Samples for density measurement were prepared according to ASTM D4703 and reported in grams/cubic centimeter (g/cc or g/cm$^3$). Measurements were made within one hour of sample pressing using ASTM D792, Method B.

DSC Crystallinity

Differential scanning calorimetry (DSC) can be used to measure the crystallinity of a sample at a given temperature for a wide range of temperatures. For the examples, a TA model Q1000 DSC (TA Instruments, New Castle, DE) equipped with an RCS (refrigerated cooling system) cooling accessory and an auto-sampler module was used to perform the tests. During testing, a nitrogen purge gas flow of 50 mL/min was used. Resins were compression-molded into 3 mm thick by 1 inch circular plaques at 350° C. for 5 minutes under 1500 psi pressure in air. The sample was then taken out of the press and placed on a counter top to cool to room temperature (approximately 25° C.). A 3-10 mg sample of the cooled material was cut into a 6 mm diameter disk, weighed, placed in a light aluminum pan, and crimped shut. The sample was then tested for its thermal behavior.

The thermal behavior of the sample was determined by changing the sample temperature upwards and downwards to create a response versus temperature profile. The sample was first rapidly heated to 180° C. and held at an isothermal state for 3 minutes in order to remove any previous thermal history. Next, the sample was cooled to −40° C. at a 10° C./min cooling rate and held at −40° C. for 3 minutes. The sample was then heated to 150° C. at a 10° C./min heating rate. The cooling and second heating curves were recorded. The values determined were peak melting temperature ($T_m$), peak crystallization temperature ($T_c$), heat of fusion ($H_f$) (in J/g), and the calculated percent crystallinity for polyethylene samples using the following Equation 1:

$$\%\ \text{crystallinity} = \frac{H_f}{292\ \text{J/g}} \times 100 \quad \text{(Eq. 1)}$$

The heat of fusion ($H_f$) and the peak melting temperature are reported from the second heat curve. Peak crystallization temperature was determined from the cooling curve.

Gel Permeation Chromatography (GPC)

The GPC system consists of a PolymerChar GPC-IR (Valencia, Spain) high temperature GPC chromatograph equipped with an internal IR5 infra-red detector (IR5) and 4-capillary solution viscometer (DV) coupled to a Precision Detectors (now Agilent Technologies, Amherst, MA) 2-angle light scattering (LS) detector Model 2040. A GPC with the last two independent detectors and at least one of the first detectors is sometimes referred to as "3D-GPC," while the term "GPC" alone generally refers to conventional GPC. For all absolute light scattering measurements, the 15-degree angle was used for measurement. The autosampler oven compartment was operated at 160° C. and the column compartment was operated at 150° C. The columns used were 4 Agilent "Mixed A" 30 cm 20-micron linear mixed-bed columns. The chromatographic solvent used was 1,2,4 trichlorobenzene and contained 200 ppm of butylated hydroxytoluene (BHT). The solvent source was sparged with nitrogen. The polyethylene samples were gently stirred at 160° C. for four hours. The injection volume was 200 μL. The flow rate through the GPC was set at 1 mL/minute.

The GPC column set was calibrated before running the examples by running at least twenty narrow molecular weight distribution polystyrene standards. The molecular weight (MW) of the standards ranged from 580 to 8,400,000 grams per mole, and the standards were contained in 6 "cocktail" mixtures. Each standard mixture had at least a decade of separation between individual molecular weights. The standard mixtures were purchased from Agilent Technologies. The polystyrene standards were prepared at 0.025 g in 50 mL of solvent for molecular weights equal to or greater than 1,000,000 g/mol and 0.05 g in 50 mL of solvent for molecular weights less than 1,000,000 g/mol. The polystyrene standards were dissolved at 80° C. with gentle agitation for 30 minutes. The narrow standards mixtures were run first and in order of decreasing highest molecular weight component to minimize degradation. The polystyrene standard peak molecular weights were converted to polyethylene molecular weight using Equation 2 (as described in Williams and Ward, *J. Polym. Sci., Polym. Let.*, 6, 621 (1968)):

$$M_{polyethylene}=A\times(M_{polystyrene})^B \quad \text{(Eq. 2)}$$

where M is the molecular weight of polyethylene or polystyrene (as marked), A has a value of 0.43, and B is equal to 1.0.

A polynomial between $3^{rd}$ and $5^{th}$ order was used to fit the respective polyethylene-equivalent calibration points. The total plate count of the GPC column set was performed with Eicosane (prepared at 0.04 g in 50 mL of TCB and dissolved for 20 minutes with gentle agitation). The plate count (Equation 3) and symmetry (Equation 4) were measured on a 200 μL injection according to the following equations:

$$\text{Plate Count} = 5.54 * \left(\frac{RV_{Peak\ Max}}{\text{Peak Width at } \frac{1}{2} \text{ height}}\right)^2 \quad \text{(Eq. 3)}$$

where RV is the retention volume in mL, the peak width is in mL, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } PV_{one\ tenth\ height})} \quad \text{(Eq. 4)}$$

where RV is the retention volume in mL and the peak width is in mL, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/mL and the solvent (contained 200 ppm BHT) was added to a pre-nitrogen-sparged septa-capped vial, via the PolymerChar high temperature autosampler. The samples were dissolved for 2 hours at 160° C. under "low speed" shaking.

The calculations of $Mn_{(GPC)}$, $Mw_{(GPC)}$, and $Mz_{(GPC)}$ were based on the GPC results using the internal IR5 detector (measurement channel of the PolymerChar GPC-IR chromatograph according to Equations 5-7, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 2.

$$Mn_{(GPC)} = \frac{\sum^{i} IR_i}{\sum^{i} \left(IR_i / M_{polyethylene_i}\right)} \quad \text{(Eq. 5)}$$

$$Mw_{(GPC)} = \frac{\sum^{i} \left(IR_i * M_{polyethylene_i}\right)}{\sum^{i} IR_i} \quad \text{(Eq. 6)}$$

$$Mz_{(GPC)} = \frac{\sum^{i} \left(IR_i * M^2_{polyethylene_i}\right)}{\sum^{i} \left(IR_i * M_{polyethylene_i}\right)} \quad \text{(Eq. 7)}$$

In order to monitor the deviations over time, a flow rate marker (decane) was introduced into each sample via a micropump controlled with the PolymerChar GPC-IR system. This flow rate marker (FM) was used to linearly correct the pump flow rate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flow rate (Flowrate (effective)) for the entire run. To facilitate the highest accuracy of a RV measurement of the flow maker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flow rate (with respect to the narrow standards calibration) is calculated as Equation 8. Processing of the flow marker peak was done via the PolymerChar GPCOne™ Software. Acceptable flow rate correction is such that the effective flow rate should be within +/−2% of the nominal flow rate.

$$\text{Flowrate}_{(effective)} = \text{Flowrate}_{(nominal)} * \left(\frac{RV_{(FM\ Calibrated)}}{RV_{(FM\ Sample)}}\right) \quad \text{(Eq. 8)}$$

Triple Detector GPC (3D-GPC)

The chromatographic system, run conditions, column set, column calibration, and calculation conventional molecular weight moments and the distribution were performed according to the method described in the Gel Permeation Chromatography (GPC).

For the determination of the viscometer and light scattering detector offsets from the IR5 detector, the systematic approach for the determination of multiple detector offsets was performed in a manner consistent with that published by Balke, Mourey, et al. (Mourey and Balke, *Chromatography Polym.*, Chapter 12, (1992)) (Balke, Thitiratsakul, Lew, Cheung, Mourey, *Chromatography Polym.*, Chapter 13, (1992)), optimizing triple detector log ($M_w$ and intrinsic viscosity) results from a broad homopolymer polyethylene standard (Mw/Mn>3) to the narrow standard column calibration results from the narrow standards calibration curve using PolymerChar GPCOne™ Software.

The absolute molecular weight data was obtained in a manner consistent with that published by Zimm (Zimm, B. H., *J. Chem. Phys.,* 16, 1099 (1948)) and Kratochvil (Kratochvil, P., *Classical Light Scattering from Polymer Solutions*, Elsevier, Oxford, NY (1987)). The overall injected concentration used in the determination of the molecular weight is obtained from the mass detector area and the mass detector constant derived from a suitable linear polyethylene homopolymer, or one of the polyethylene standards of known weight-average molecular weight. The calculated molecular weights (using GPCOne™) are obtained using a light scattering constant derived from one or more of the polyethylene standards mentioned and a refractive index concentration coefficient, dn/dc, of 0.104. Generally, the mass detector response (IR5) and the light scattering constant (determined using GPCOne™) should be determined from a linear standard with a molecular weight in excess of about 50,000 g/mol. The viscometer calibration (determined using GPCOne™) can be accomplished using the methods described by the manufacturer or alternatively by using the published values of suitable linear standards such as Standard Reference Materials (SRM) 1475a (available from National Institute of Standards and Technology (NIST)). A viscometer constant (obtained using GPCOne™) is calculated which relates specific viscosity area (DV) and injected mass for the calibration standard to its intrinsic viscosity. The chromatographic concentrations are assumed low enough to eliminate addressing $2^{nd}$ viral coefficient effects (concentration effects on molecular weight).

The absolute weight average molecular weight ($Mw_{(Abs)}$) is obtained (using GPCOne™) from the Area of the Light Scattering (LS) integrated chromatogram (factored by the light scattering constant) divided by the mass recovered from the mass constant and the mass detector (IR5) area. The molecular weight and intrinsic viscosity responses are linearly extrapolated at chromatographic ends where signal to noise becomes low (using GPCOne™). Other respective moments, $Mn_{(Abs)}$ and $Mz_{(Abs)}$ are calculated according to equations 9-10 as follows:

$$Mn_{(Abs)} = \frac{\sum^{i} IR_i}{\sum^{i} \left(IR_i / M_{Absolute_i}\right)} \quad \text{(Eq. 9)}$$

$$Mz_{(Abs)} = \frac{\sum^{i} \left(IR_i * M^2_{Absolute_i}\right)}{\sum^{i} \left(IR_i * M_{Absolute_i}\right)} \quad \text{(Eq. 10)}$$

PDI is computed as Mw divided by Mn (i.e., Mw/Mn).

Fourier Transform Infrared Analysis

Sample films (approximately 250-300 microns in thickness) used for Fourier-Transform Infrared (FTIR) analysis were compression molded by pressing approximately 0.5 g of pellets of the sample in a Carver hydraulic press with heated platens set to 190° C.

High Temperature Liquid Chromatography (HTLC)

High temperature liquid chromatography (HTLC) was employed for separation and characterization of Si-PE hybrid. Free PDMS was quantified by external standard calibration method. Sample solutions were prepared at ~2.0 mg/mL in anhydrous decane. Samples were dissolved using a lab heated shaker at 130° C. for ~1 hour. After that the sample solution was transferred to the PolymerChar autosampler. The sample solution was re-heated and shaken at 130° C. by the heated shaker in PolymerChar for 1 hour prior to injection. HTLC was based on the PolymerChar high temperature 2DLC/GPC instrument. LC pump was an Agilent 1260 HPLC system that was set a flow rate of 1.0 mL/min. Injection loop was a 20 μL of solution. A ThermoFisher hypercarb column (4.6 mm i.d.×100 mm l., 5 um particle size and 260 Å pore size) held at 130° C. was used for the separation. The detector was an Agilent HT-ELSD detector (model G7826A) with the settings of nebulizer temperature 160° C.; evaporator temperature 120° C. and $N_2$ flow at 0.2 SLM. The gradient of decane to ODCB was applied in the separation according to Table 1. The data were collected by PolymerChar software version 1.1, and was reduced by Agilent SEC software Cirrus 3.3.

TABLE 1

| Gradient table | | |
|---|---|---|
| time | n-decane | ODCB |
| 0 | 100 | 0 |
| 10 | 100 | 0 |
| 20 | 0 | 100 |
| 25 | 0 | 100 |
| 30 | 100 | 0 |

Nuclear Magnetic Resonance (NMR)

The samples were prepared by adding 0.1 to 0.2 g of sample to 3.25 g of 50/50 by weight Tetrachlorethane-d2/Perchloroethylene with 0.001 M $Cr(AcAc)_3$ in a Norell 1001-7 10 mm NMR tube. The samples were purged by bubbling $N_2$ through the solvent via a pipette inserted into the tube for approximately 5 minutes to prevent oxidation, capped, and sealed with Teflon tape. The samples were heated and vortexed at 115-135° C. to ensure homogeneity. $^1$H NMR was performed on a Bruker AVANCE 600 MHz spectrometer equipped with a Bruker 10 mm CryoProbe and a sample temperature of 120° C. The spectra were acquired with ZG pulse, 16 scans, AQ 1.8s, $D_1$ 14s. The polymer integral from about 0.6 to 2.6 ppm was set to an arbitrary value. This value divided by 2 gives the total moles of polymer $CH_2$s. Total moles $CH_2$ multiplied by 14 g/mol gives the polymer weight. The PDMS integral from about −0.3 to 0.6 ppm divided by 6 gives moles PDMS units. Multiplying by 74.1 g/mol PDMS unit gives the PDMS weight. The two weights are used to calculate wt % PDMS.

Peel Strength

Peel strength was measured by putting the film's C layer in contact with a commercial pouch wrap film ("Salvaslip EVAX normal" from The Procter & Gamble Company, Cincinnati, OH). The sample was conditioned for 20 hours at 40° C. in an oven under a 2 kg weight, and then at 4 hours at room temperature without weight. The peel strength was run on a 25×175 mm prove with a 10 N cell using a speed of 300 mm/min, a grip distance of 25 mm, and a measurement distance of 100 mm at 90°.

Coefficient of Friction (COF)

COF inside versus outside was measured according to ISO-8295, placing the C layer as inside and the A layer as outside.

EXAMPLES

The following examples illustrate features of the present disclosure but are not intended to limit the scope of the disclosure.

Example 1

The f-PDMS used for copolymerization was a 1:2:1 mixture of the following three siloxanes:

(Table 2). For comparison reasons, LDPE-g-PDMS was also analyzed by NMMR and showed 7.47 wt % of PDMS in a resin total.

Amount of unattached (free) f-PDMS in LDPE-co-PDMS resin was estimated by using HTLC analysis. Average value from two repetitions for Sample 3 was 3.0 wt % of unattached PDMS in a resin that corresponds to 61.4% conversion of the added f-PDMS to LDPE-co-PDMS. For LDPE-g-PDMS resin, HTLC showed 6.8 wt % of unattached methacrylate functionalized PDMS MW = 15K

| F-PDMS | ratio |
|---|---|
| 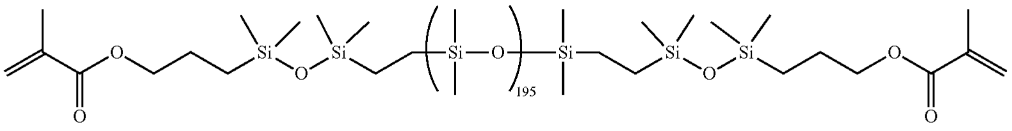 | 1 |
| 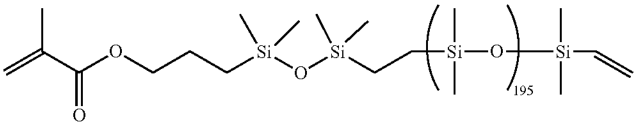 | 2 |
| 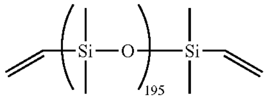 | 1 |

Polymerization was carried out in a continuously stirred tank reactor (CSTR) with a volume of 300 mL heated to 220° C. using four electric heater bands. The agitator speed was 1800 revolutions per minute (RPM). The reactor pressure was controlled to approximately 193 MPa. Propylene was used as a chain transfer agent. Ethylene and propylene were fed to the top of the reactor along the agitator shaft at a flow rate of 5440-5470 g/h ethylene in the ratios reported in Table 1, below. TPA and TPO were used as initiators in a 0.61:1 mass ratio. The initiators were diluted in ISOPAR E (available from ExxonMobil Chemical Co.) and injected into the side of the reactor at a pressure of 193 MPa at a ratio of 30-33 mass ppm TPA and 50-54 mass ppm TPO to ethylene. The f-PDMS was diluted in ethyl acetate (available from Sigma Aldrich) to 30 wt % and separately injected into the side of the reactor at a flow rate as reported in Table 1, below.

The reactor residence time was about 1.5 minutes. All unreacted reactants and polymer were emitted via a single outlet located on the bottom of the reactor. The LDPE-co-PDMS polymer was then separated from the remaining reactants by atomization, depressurizing the stream to about 0.1 MPa and simultaneously cooling the stream to ambient temperatures. The LDPE-co-PDMS polymer was then collected in powder form.

LDPE with 10 wt % PDMS grafted thereon ("LDPE-g-PDMS", 15K Mn of the starting PDMS) was also obtained. The LDPE-g-PDMS was prepared according to the methods described in U.S. Pat. No. 8,691,923, the entirety of which is hereby incorporated by reference.

Amount of both attached and unattached PDMS in sample 3 was estimated by HNMR and showed 7.77 wt % of PDMS in a resin. For sample 1 and 2 wt % of PDMS was determined based on addition flow during copolymerization PDMS that corresponds to only 9% conversion of the added unfunctionalized PDMS to LDPE-g-PDMS.

The process conditions by which the LDPE-co-PDMS polymers were made are reported in Table 2.

TABLE 2

| | Reaction Temp. (° C.) | Ethylene Conversion (wt %) | Propylene/ Ethylene (mol ppm) | f-PDMS/ Ethylene (mass ppm) | Avg. Melt Index at 190° C. ($I_2$) (dg/min) |
|---|---|---|---|---|---|
| Comparative Sample A (no f-PDMS) | 220.89 | 11.29 | 24900 | 0 | 2.9 |
| Sample 1 (2 wt % f-PDMS) | 217.17 | 10.00 | 29700 | 2620 | 1.7 |
| Sample 2 (5 wt % f-PDMS) | 217.03 | 10.77 | 32400 | 6680 | 1.9 |
| Sample 3 (7.77 wt % f-PDMS) | 217.48 | 11.56 | 29600 | 13210 | 1.9 |

Example 2

Figure 1B:
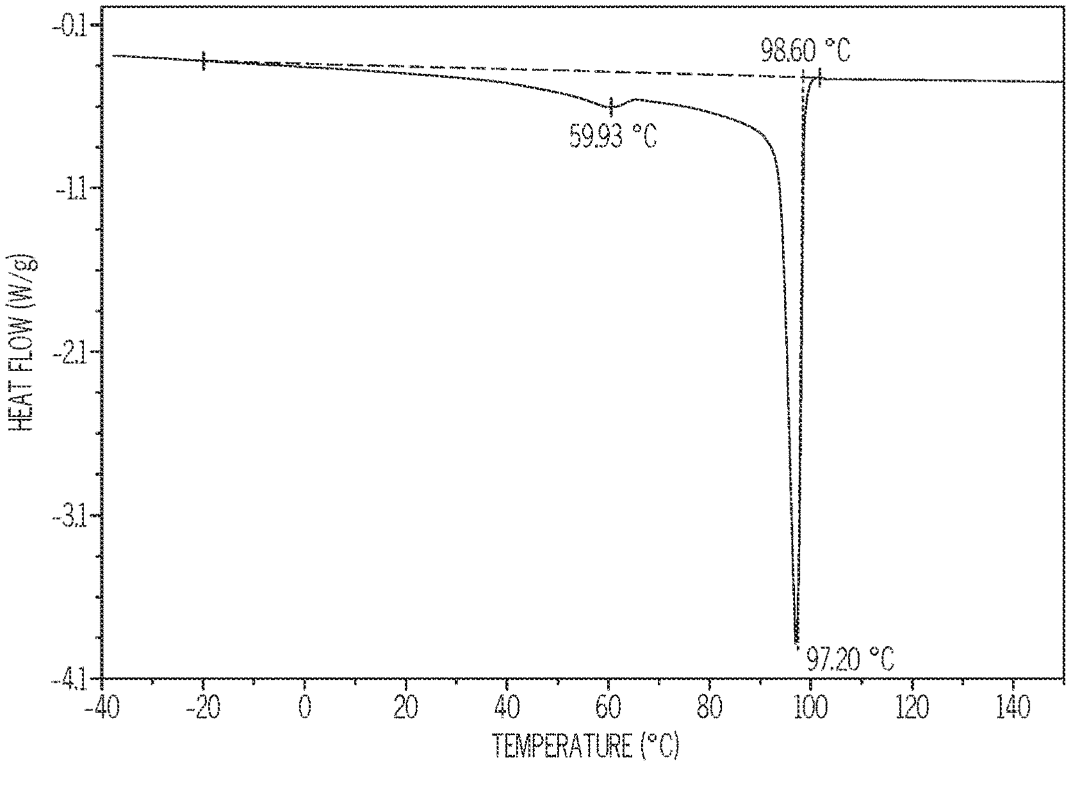
FIG. 1B is a DSC cooling curve of an example LDPE-co-PDMS according to one or more embodiments shown and described herein.

DSC analysis of the LDPE-co-PDMS of Sample 3 was performed and the results are provided in FIGS. 1A and 1B. The data shown in FIGS. 1A and 1B shows a melting temperature of 107.7° C. (FIG. 1A) and a heat of fusion of 136.1 J/g (FIG. 1B). Density of Sample 3 was 0.9256 g/$cm^3$ measured according to ASTM methods.

Figure 2:
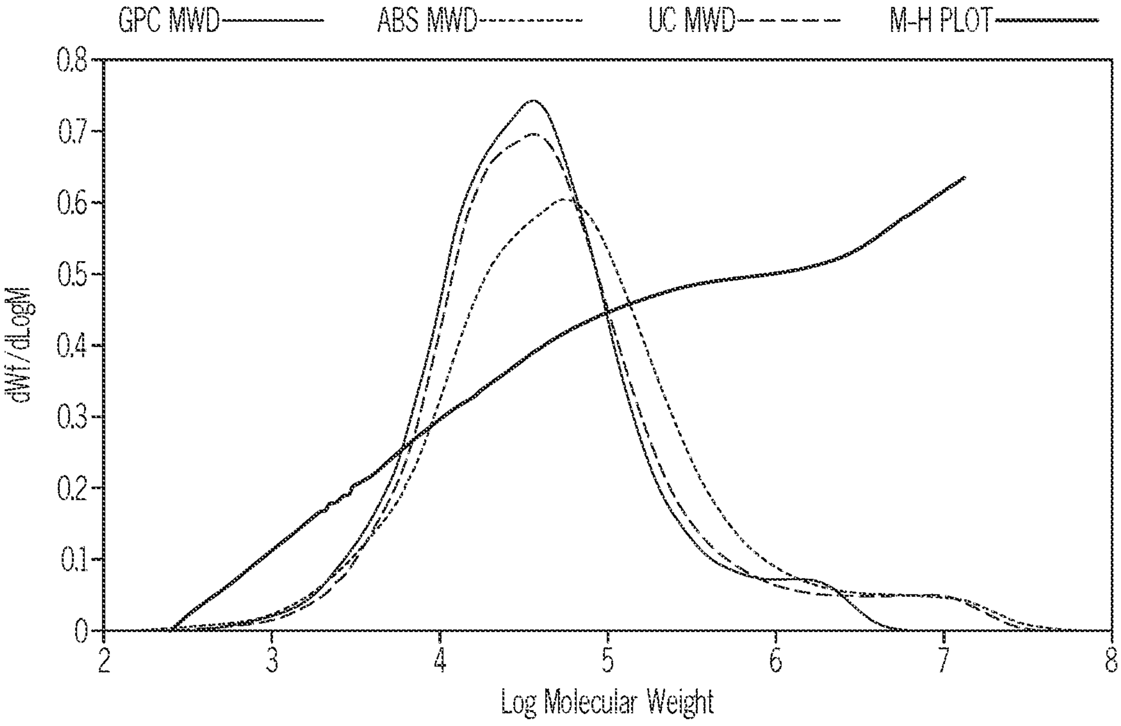
FIG. 2 is a plot of the molecular weight distribution obtained from gel permeation chromatography (GPC) analysis of an example LDPE-co-PDMS according to one or more embodiments shown and described herein.

Sample 3 was additionally analyzed using conventional GPC and 3D-GPC. Table 3 reports the molecular weight properties for the sample. The molecular weight distribution is plotted in FIG. 2.

TABLE 3

| Molecular Weight Properties | | | |
|---|---|---|---|
| Conventional GPC | | Absolute GPC (3D-GPC) | |
| Mn | 14,600 | Mn | 15,540 |
| Mp | 35,990 | Mw | 601,010 |
| Mv | 91,880 | Mz(BB) | 1,883,550 |
| Mw | 136,800 | Mz(abs) | 12,832,240 |
| Mz | 1,271,320 | Mz + 1(BB) | 2,952,220 |
| PDI | 9.37 | Mz/Mw | 21.35 |

Example 3

Figure 3A:
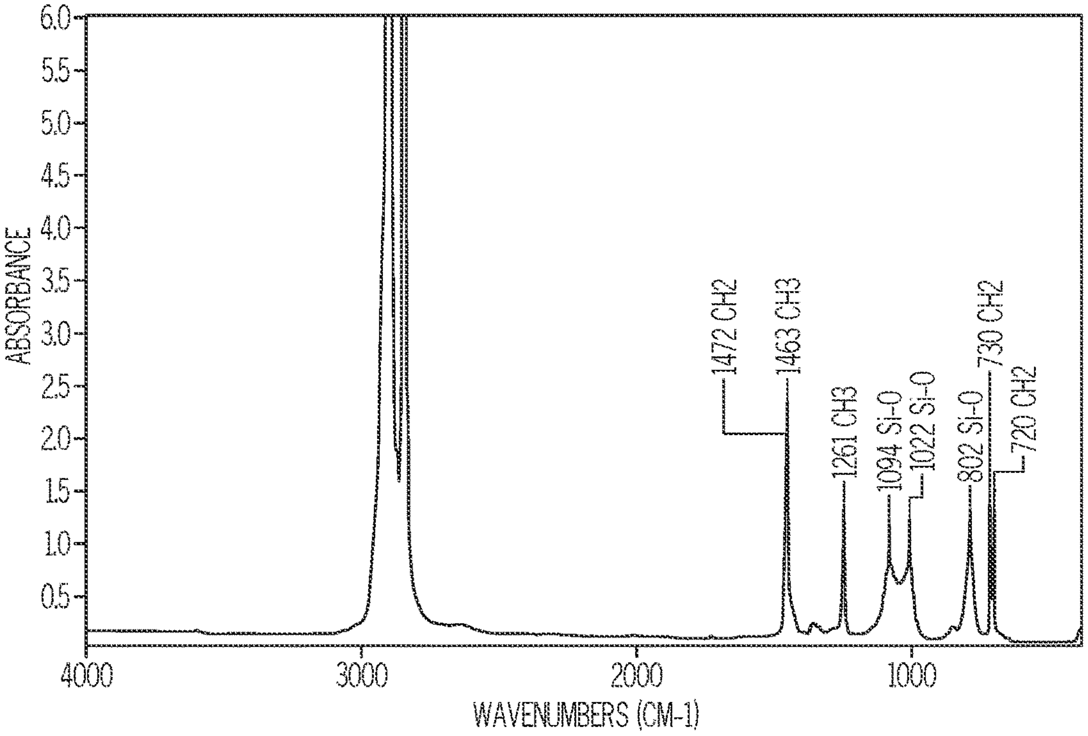
FIG. 3A is a Fourier-transform infrared (FTIR) spectrum for an LDPE-g-PDMS.
Figure 3B:
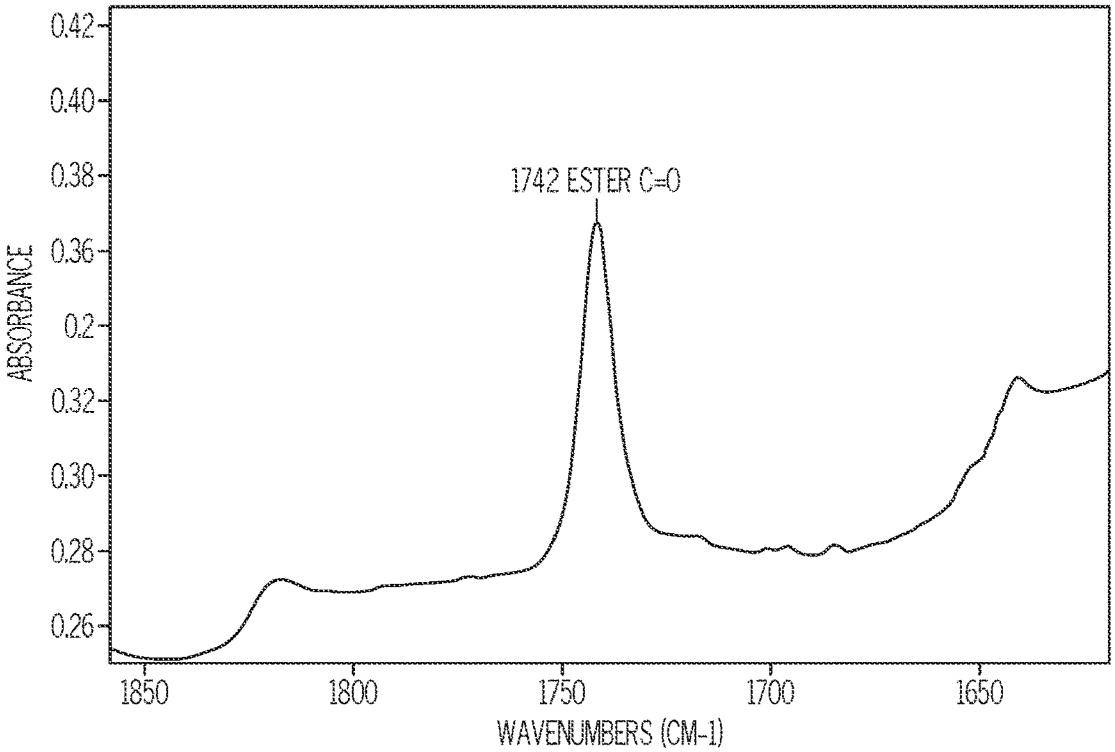
FIG. 3B is a close up of the FTIR spectrum of FIG. 3A from about 1850 to about 1600 $cm^{-1}$.
Figure 3C:
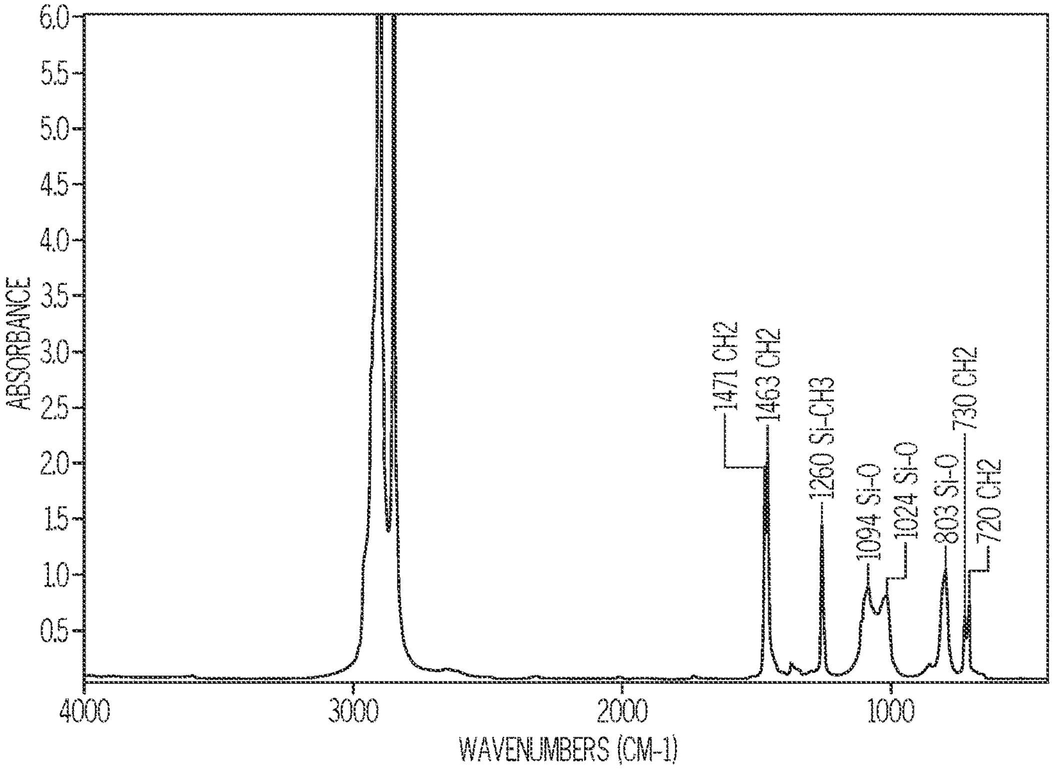
FIG. 3C is an FTIR spectrum for an example LDPE-co-PDMS according to one or more embodiments shown and described herein.
Figure 3D:
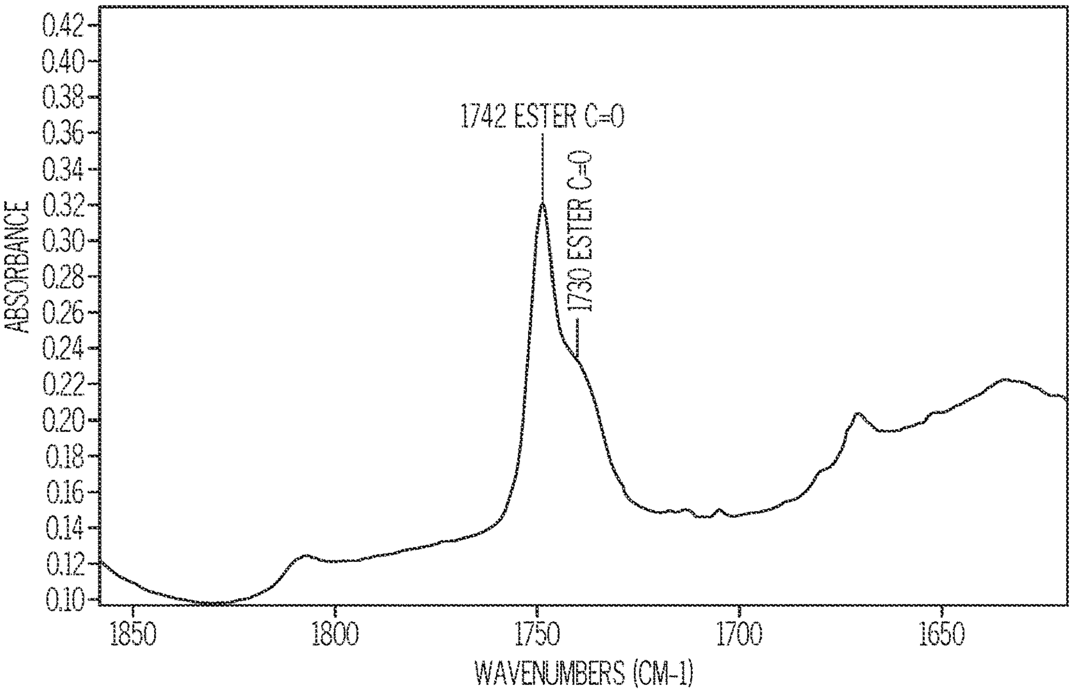
FIG. 3D is a close up of the FTIR spectrum of FIG. 3C from about 1850 to about 1600 $cm^{-1}$.

Sample 3 prepared as described hereinabove was further analyzed using IR spectroscopy. An IR spectra for a copolymer of LDPE-g-PDMS was also obtained. The spectra for the LDPE-g-PDMS are presented in FIGS. 3A and 3B, and the spectra for LDPE-co-PDMS are presented in FIGS. 3C and 3D, with FIG. 3B showing additional detail from FIG. 3A from about 1850 to about 1650 $cm^{-1}$, and FIG. 3D showing additional detail from FIG. 3C from about 1850 to about 1600 $cm^{-1}$. In both sets of IR spectra, peaks corresponding to LDPE and PDMS are shown. In both sets of IR spectra, a peak at 1742 $cm^{-1}$ corresponds to ethylacetate that was used as a solvent to add PDMS and functional PDMS. However, the peak at 1730 $cm^{-1}$ is present only in the IR spectra for PDMS-co-LDPE, corresponding to the ester function of the copolymerized methacrylate functional group.

Example 4

To evaluate mechanical properties of the PDMS-co-LDPE in film applications, three films each having an A/B/C structure were prepared by extrusion. For each of Comparative Sample B, Comparative Sample C, and Sample 4, the substrate layers A and B were 70 wt % DOWLEX™ 2042EC and 30 wt % LDPE 310E. DOWLEX™ 2042EC is a linear low density polyethylene (LLDPE) having a melt index (MI) of 1 g/10 min and a density of 0.930 g/cc, available from The Dow Chemical Company (Midland, MI). LDPE 310E is an LDPE with an MI of 0.75 g/10 min and a density of 0.923 g/cc available from The Dow Chemical Company (Midland, MI). For Comparative Sample B, the functional layer C was 100% LDPE 310E. For Comparative Example C, the functional layer C was Comparative Sample A (no f-PDMS added, see Table 1), an LDPE having an MI of 2 g/10 min and a density of 0.920 g/cc. For Sample 4, the functional layer C was PDMS-co-LDPE formed from a 15,000 K functionalized PDMS copolymerized with ethylene as described hereinabove at 10 wt % of PDMS. All attempts to make film from LDPE-g-PDMS failed due to low processability.

Peel strength and coefficient of friction measurements were conducted, and the results are presented in Table 4.

TABLE 4

| Peel Strength and Coefficient of Friction (COF) Results | | | |
|---|---|---|---|
| | Comparative Sample B | Comparative Sample C | Sample 4 |
| Peel Max Force (N) | 8.0 | 8.0 | 3.8 |
| Peel Ave. Force (N) | 2.9 | 3.3 | 1.6 |
| Static COF | 0.61 | 0.60 | 0.37 |
| Dynamic COF | 0.64 | 0.60 | 0.30 |

As seen from the results in Table 4, the LDPE-co-PDMS exhibits lower peel max and peel average forces, as well as lower static and dynamic coefficient of friction as compared to LDPE alone, both commercial one and produced at the same facility/reactor and under the same conditions as Sample 4. Low COF is important for films, where a lower COF can be critical for films easily being transported across surfaces or across other films. This can also be important for stacking of films. Low COF can be accomplished by the addition of additives to the film, but migration of these additive often occurs so that with time, the COF changes. However, because the COF control agent (e.g., PDMS) is part of the polymer, such migration cannot occur and the COF is expected to remain stable over time.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A polymer composition comprising polyethylene and a reaction product of the copolymerization of ethylene monomer and (meth) acrylic ester functionalized polysiloxane, and optionally one or more units derived from a termonomer, wherein the (meth) acrylic ester functionalized polysiloxane has a structural formula of one or more of the following:

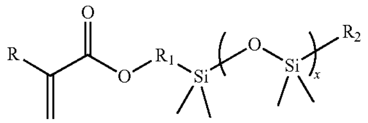

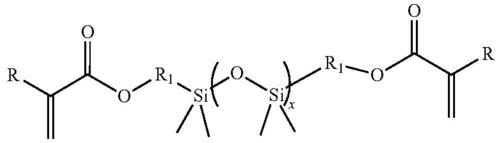

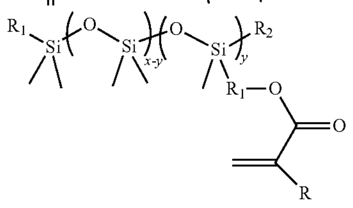

where: R is methyl or hydrogen; $R_1$ is a bridge group that connects functional group (meth) acrylate with siloxane selected from the group consisting of a $C_2$-$C_{20}$ alkylene linker where one or more carbon atoms can be substituted with oxygen and silicon; $R_2$ is an end group selected from alkyl, aryl, or alkenyl; x is an integer from 10 to 1000; and y is an integer from 1 to 20.

2. The polymer composition of claim 1, wherein the reaction product of the copolymerization of the ethylene monomer and the (meth)acrylic ester functionalized polysiloxane comprises one or more of the following structures:

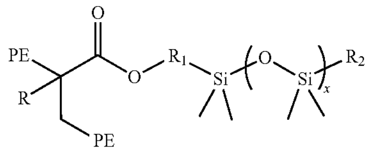

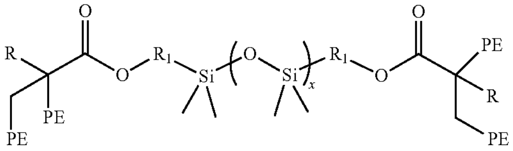

and

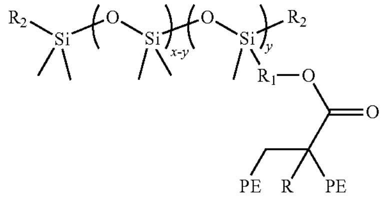

where PE is polyethylene.

3. The polymer composition of claim 1, wherein the polymer composition has an MWD of 3 to 50.

4. The polymer composition of claim 1, wherein the termonomer is present and is selected from the group consisting of an olefin, an unsaturated ester, an unsaturated acid, a functionalized alkene, and combinations thereof.

5. A blend comprising the polymer composition of claim 1, and one or more additional polymers.

6. The blend of claim 5, wherein the one or more additional polymers comprises low density polyethylene (LDPE), linear low density polyethylene (LLDPE), ultra low density polyethylene (ULDPE), very low density polyethylene (VLDPE), medium density polyethylene (MDPE), high density polyethylene (HDPE), a copolymer including a (meth) acrylate ester, a copolymer comprising (meth) acrylic acid, mono-or diester of maleic acid, a copolymer comprising vinyl acetate, a copolymer comprising trialkoxy vinylsilane, grafted polyethylene, or derivatives or combinations thereof.

7. An article comprising the polymer composition of claim 1.

8. The article of claim 7, wherein the article is a film.

9. The polymer composition of claim 1 wherein R is methyl.

10. The polymer composition of claim 1 wherein $R_2$ is an alkenyl.

11. The polymer composition of claim 1, wherein the polyethylene comprises LDPE.

12. The polymer composition of claim 1, wherein the $C_2$-$C_{20}$ alkylene linker of the $R_1$ bridge group has carbon atoms substituted with oxygen and silicon.

13. A process comprising:

reacting, in a polymerization reactor under free-radical polymerization conditions and at a pressure greater than or equal to 100 MPa, ethylene monomer and a (meth) acrylate ester functionalized polysiloxane to produce polyethylene and a copolymer comprising low density polyethylene (LDPE) and functionalized polydimethylsiloxane (PDMS), wherein the (meth)

acrylic ester functionalized polysiloxane has a structural formula of one or more of the following:

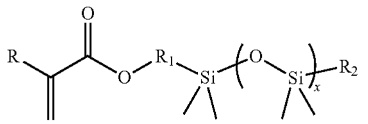

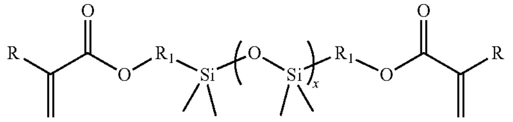

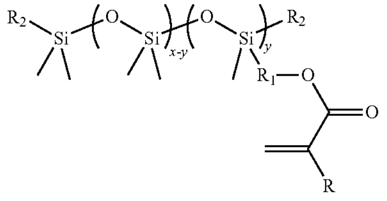

where: R is methyl or hydrogen; $R_1$ is a bridge group that connects functional group (meth)acrylate with siloxane selected from the group consisting of a $C_2$-$C_{20}$ alkylene linker where one or more carbon atoms can be substituted with oxygen and silicon; $R_2$ is an end group selected from alkyl, aryl, or alkenyl; x is an integer from 10 to 1000; and y is an integer from 1 to 20.

14. The process of claim 13 wherein the copolymer comprises one or more of the following structures:

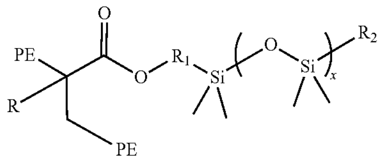

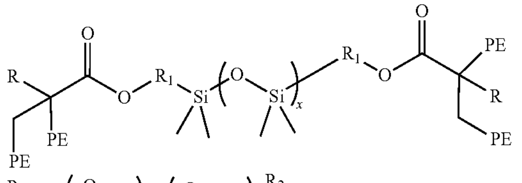

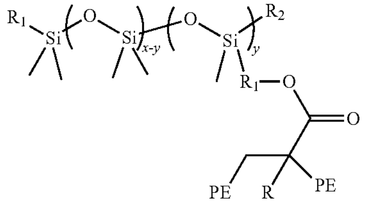

where PE is polyethylene.

15. The process of claim 13 wherein R is methyl.

16. The process of claim 13 wherein $R_2$ is an alkenyl.

17. The process of claim 13, wherein the polyethylene comprises LDPE.

18. The process of claim 13, wherein the $C_2$-$C_{20}$ alkylene linker of the $R_1$ bridge group has carbon atoms substituted with oxygen and silicon.

* * * * *